United States Patent
Van De Bergh et al.

(10) Patent No.: US 6,714,741 B1
(45) Date of Patent: Mar. 30, 2004

(54) METHOD AND APPARATUS FOR MONITORING AN OPTICAL WDM NETWORK

(75) Inventors: Marco Pierre Hendrik Van De Bergh, Susteren (NL); Harmen Joseph Sebastiaan Dorren, Utrecht (NL); Johannes Jacobus Gerardus Maria Van Der Tol, Helmond (NL); Jan Marcel Rijnders, Leiden (NL)

(73) Assignee: Koninklijke KPN N.V., Hague (NL)

(*) Notice: Subject to any disclaimer, the term of this patent is extended or adjusted under 35 U.S.C. 154(b) by 0 days.

(21) Appl. No.: 09/807,870
(22) PCT Filed: Sep. 24, 1999
(86) PCT No.: PCT/EP99/07401
§ 371 (c)(1), (2), (4) Date: Apr. 19, 2001
(87) PCT Pub. No.: WO00/25451
PCT Pub. Date: May 4, 2000

(30) Foreign Application Priority Data

Oct. 23, 1998 (EP) .............................................. 98203581

(51) Int. Cl.[7] .............................................. H04B 10/08
(52) U.S. Cl. .......................................... 398/34; 398/25
(58) Field of Search ............................ 398/25, 26, 27, 398/33, 34, 28, 29, 30, 31, 32

(56) References Cited

U.S. PATENT DOCUMENTS

| 5,654,816 A | * | 8/1997 | Fishman .................... 359/349 |
| 5,894,362 A | * | 4/1999 | Onaka et al. ................. 398/95 |
| 6,215,565 B1 | * | 4/2001 | Davis et al. ................. 398/27 |
| 6,532,087 B1 | * | 3/2003 | Ransford et al. ............. 398/27 |

FOREIGN PATENT DOCUMENTS

| EP | 0546707 A2 | 6/1993 |
| EP | 0828356 A2 | 3/1998 |
| FR | 2 740 282 | 4/1997 |

* cited by examiner

Primary Examiner—Leslie Pascal
Assistant Examiner—Christina Y Leung
(74) Attorney, Agent, or Firm—Frishauf, Holtz, Goodman & Chick, P.C.

(57) ABSTRACT

A method and apparatus for monitoring an optical network being equipped with WDM equipment able to transmit a plurality of data channels at different wavelengths. From the said optical network a part of its optical signal power is coupled out and a specific statistical function of interest is determined which characterizes the said plurality of data channels. The parameters of said determined function of interest are processed in a predetermined mathematical model having a finite number of parameters and from said model information is derived on individual channels. Data representing the said information are produced.

19 Claims, 8 Drawing Sheets

METHOD AND APPARATUS FOR MONITORING AN OPTICAL WDM NETWORK

This application is a U.S. National Phase Application under 35 USC 371 of International Application PCT/EP99/007401 (published in English) filed Sep. 24, 1999.

The present invention relates to a method and apparatus for monitoring an optical network being equipped with WDM equipment.

WDM means "Wavelength Division Multiplexing" and is a technique known to those skilled in the art and will therefore not be described in detail.

Basic monitoring parameters in an optical network are:
Total optical power
Number of data channels
Noise on every channel These monitoring parameters are processed to give the following alarm signals:
Loss of optical signal (LOS)
Signal per Channel Degradation
Loss of channel Generally, optical networks are being equipped with WDM equipment to enhance the data capacity of the optical transmission lines. A crucial point in the management of an optical WDM network is optical monitoring of the network channels. A WDM optical network layer transmits a plurality of data channels at different optical wavelengths over an optical fibre. To manage such a network layer the optical network layer is to be monitored at certain points in the network to obtain data on the quality of each channel. Failure or degradation of one of the elements in the optical network could cause the loss or degradation of one or more data channels, respectively, at a node in the optical network layer. It is up to the monitoring system of the network to report failure or degradation of channels. Existing monitor methods include pilot tones, optical bandpass filtering, photodiode arrays, waveguide gratings, and the use of optical wavelength spectrum analysers. The disadvantage of these monitor solutions is the high cost of the used equipment to realize optical monitoring.

One of the cheapest ways to monitor an optical signal is its direct detection on a photodiode, One of the major disadvantages of direct detection is the limited bandwidth of the photodiode which cannot detect optical frequencies, but only the modulated data of a data channel in the electrical domain. If an optical signal, containing multiple data channels at different optical wavelengths, is received an the photodiode, the modulated data of all data channels is transposed to the electrical domain. In the frequency and time domain of the photodiode current, the data channels become therefore unidentifiable.

FR-A-2740282 discloses an optical power measuring circuit for measuring optical power distributions of an optical signal containing multiple data channels at different optical wavelengths. The power measuring circuit includes a optoelectrical converter preceded by a tuneable wavelength filter. In the power measuring circuit the optical signal is filtered by means of a tuneable wavelength filter successively for each channel wavelength, and after conversion to the electrical domain the optical power is measured separately for each filtered signal. The measured power values are used for power control of the various optical signal sources. This known technique has among others the following drawbacks. The use of a tunable wavelength filter which should be tuned successively to the various wavelength channels, is rather expensive and does inherently not allow measuring the state of the various wavelength channels simultaneously.

In view of the above disadvantages there is a strong need for a monitor system for optical networks which can meet the following demands:
Low cost
Monitoring of multiple data channels simultaneously
Small amount of equipment necessary to realize the monitoring
Local monitoring
Independent on the location in the network
Independent on the configuration of the network
Independent on the number of data channels to be monitored.

The present invention now fulfils this need and the invention therefore provides a method for monitoring an optical network being equipped with WDM equipment able to transmit a plurality of data channels at different wavelengths, according to the preamble of claim 1, for the definition of which the above cited document FR-A-2740282 was applied, which method is, according to the invention, characterised by the characterizing part of claim 1.

The invention further provides an apparatus for monitoring an optical network being equipped with WDM equipment able to transmit a plurality of data channels at different wavelengths, according to the preamble of claim 10, for the definition of which also the above cited document FR-A-2740282 was applied, which apparatus is, according to the invention, characterised by the characterising part of claim 10.

It is remarked that DE-A-195 04 896 discloses a method and apparatus for monitoring an optical network, wherein one data channel is monitored at the same time.

However, the specific statistical analysis of an optical signal comprising a plurality of data channels and the simultaneous monitoring of a plurality of data channels according to the present invention has not been disclosed and cannot be derived therefrom.

The present invention has been based upon the fact that all data channels are statistically independent on each other. Therefore, the data channels should be separable by using a statistical analysis, The common parameters used in the said statistical analysis are the average power levels at the "0" and "1" bits and the noise on these levels for each data channel. So carrying out a statistical analysis of the optical signal containing multiple data channels should provide the noise and average power levels of each data channel and the number of channels present.

The invention will now be described by way of example in more detail by reference to the accompanying drawings, in which.

Figure 1:
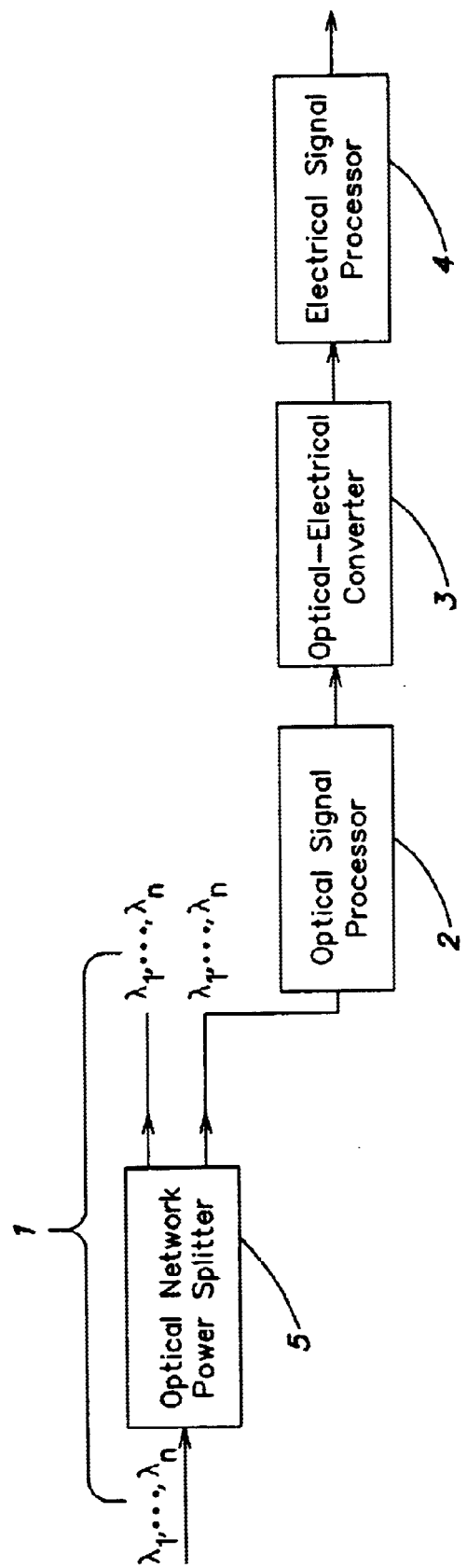
FIG. 1 represents a block scheme of the principle underlying the method according to the present invention.

Referring now to FIG. 1, a transmission line 1 of an optical network carrying data channels of different wavelengths $\lambda_1 \ldots \lambda_n$ has been shown. Further an optical signal processing block 2, an optical-electrical (O/E) converter (block 3) and an electrical signal processing block 4 are represented.

The output of block 4 is made available to the management system of the optical network in any way suitable for the purpose (not shown for reasons of clarity). At a certain point in the optical network (block 5) a part of its optical power is coupled out from the said optical network in any way suitable for the purpose and an optical signal is derived therefrom for further processing. The said coupling out advantageously takes place via a power splitter means.

It will be appreciated by those skilled in the art that it is not required to transmit an optical signal containing multiple data channels at different optical wavelengths $\lambda_1 \ldots \lambda_n$ through the optical network. Use can be made, for example, of noise present in the optical network as optical power.

Further, for opto-electronical detection of the optical signal, an O/E converter (block 3) is applied.

O/E converters are commercially available and will therefore not be described in detail. However, it will be appreciated that the quality of the O/E converter determines inter alia the maximum number of data channels to be monitored. So the requirements for the O/E converter increase with increasing number of data channels to monitor.

Figure 2:
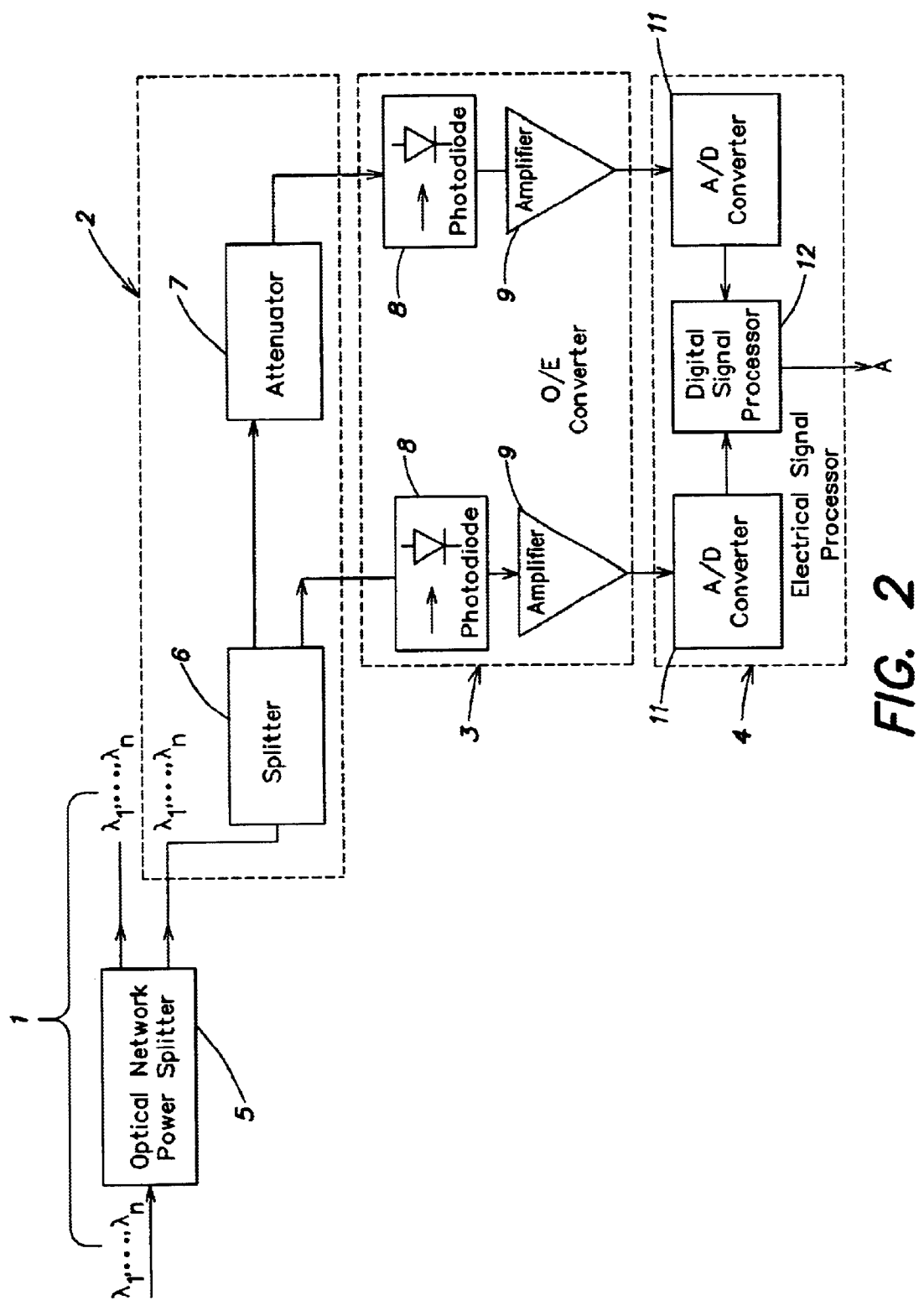
FIG. 2 represents schematically a first advantageous embodiment of the present invention.
Figure 3:
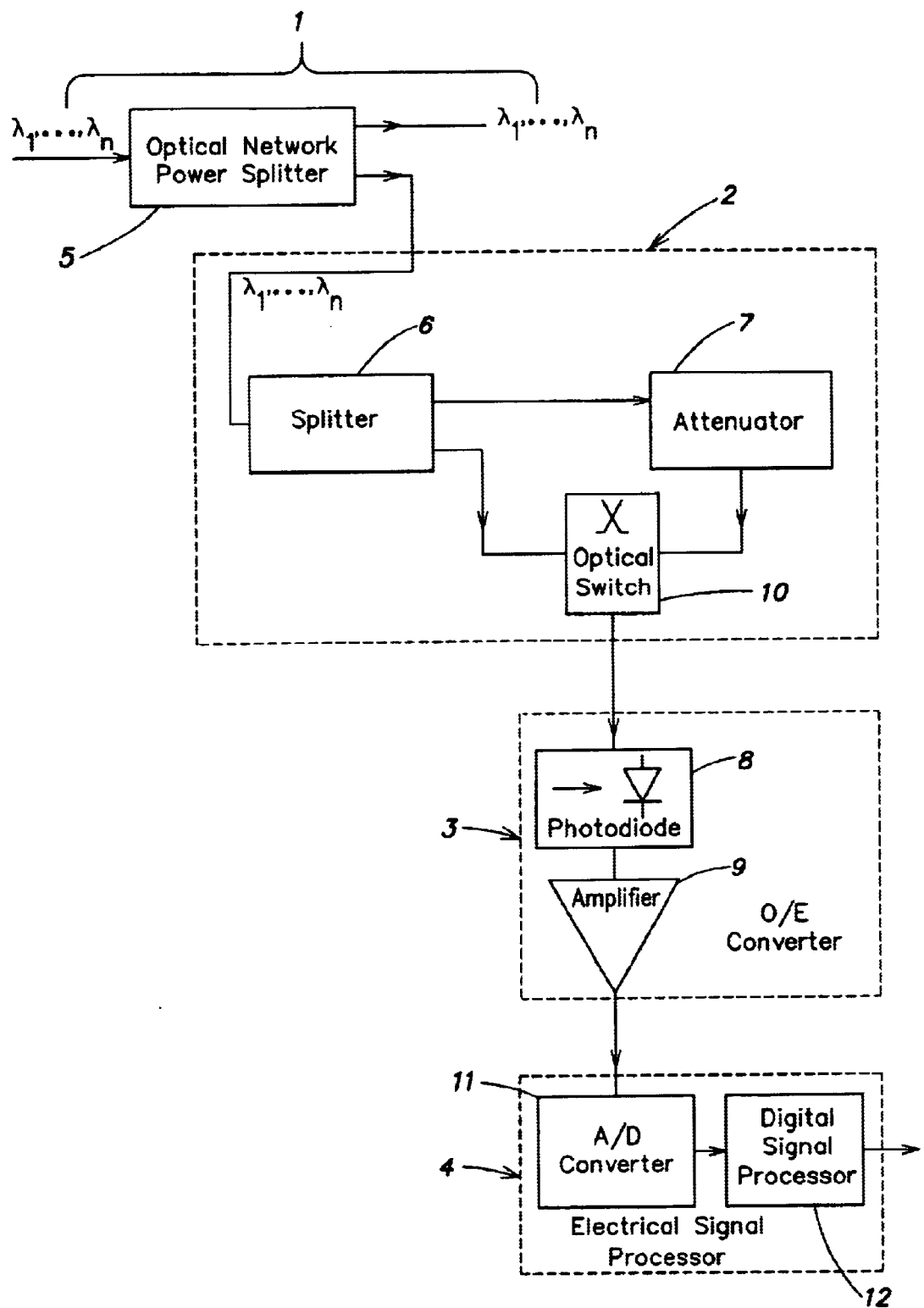
FIG. 3 represents schematically a second advantageous embodiment of the present invention.

FIGS. 2 and 3 disclose advantageous embodiments of FIG. 1. The same reference numerals as in FIG. 1 are used.

The power splitter means (block 5) is for example a 1 to 2-splitter (90/10). The signal which is coupled out is then split again, e.g. in a 1 to 2-splitter 6 (50/50) providing two sets of measurement data, said sets representing a first optical signal and a second optical signal respectively. Such splitters are commercially available and will therefore not be described in detail. In this advantageous embodiment the said second optical signal is obtained by passing the optical signal through a $\lambda$-dependent attenuator 7. Advantageously, the $\lambda$-dependent attenuator comprises two branches, the optical pathlength of the first branch being different from the optical pathlength of the second branch, and said branches having a common signal input and a common signal output. An advantageous example of such a $\lambda$-dependent attenuator is a Mach-Zehnder interferometer known as such to those skilled in the art.

In FIG. 2 the output signals of block 2 are passed to the O/E converter (block 3), comprising a photodiode 8 and optionally an amplifier 9 for each output from block 2.

In the embodiment of FIG. 3 the output signals from blocks 6 and 7 are passed to an optical switch 10 (commercially available, and will therefore not be described in detail) prior to passing to block 3.

The output of block 3 is passed to the electrical signal processing block 4. The analogue measured O/E-converted data will have to be A/D converted first in any A/D converter 11 suitable for the purpose. The resolution of the A/D converter determines the accuracy of a measured probability density function of a data channel (will be explained below), and therefore inter alia the accuracy of estimated so-called Gaussian channel parameters (will be explained below), and also the maximum number of data channels to be monitored. These A/D converters are commercially available and will therefore not be described in detail.

Subsequently, the number of times a signal power level occurs, is counted during a predetermined measurement interval. In this manner a histogram, which shows the frequency of a power level as function of the power level is obtained. The histogram is then normalised so that the surface beneath the curve equals 1, and then shows the probability density of the discrete power levels and has therefore become a probability density function. This is done for both sets of digital measurement data. So-called Gaussian channel parameters characterizing a data channel are extracted from these probability density functions. These Gaussian channel parameters are then evaluated to produce monitor information. The software to convert the discrete data into a probability density function, to estimate the Gaussian channel parameters, and to extract the monitor information can be programmed in any commercially available digital signal processing chip suitable for the purpose (block 12).

Now referring to FIGS. 4–8 data channel statistics and the extraction of the characterizing channel parameters will be explained.

Figure 4:
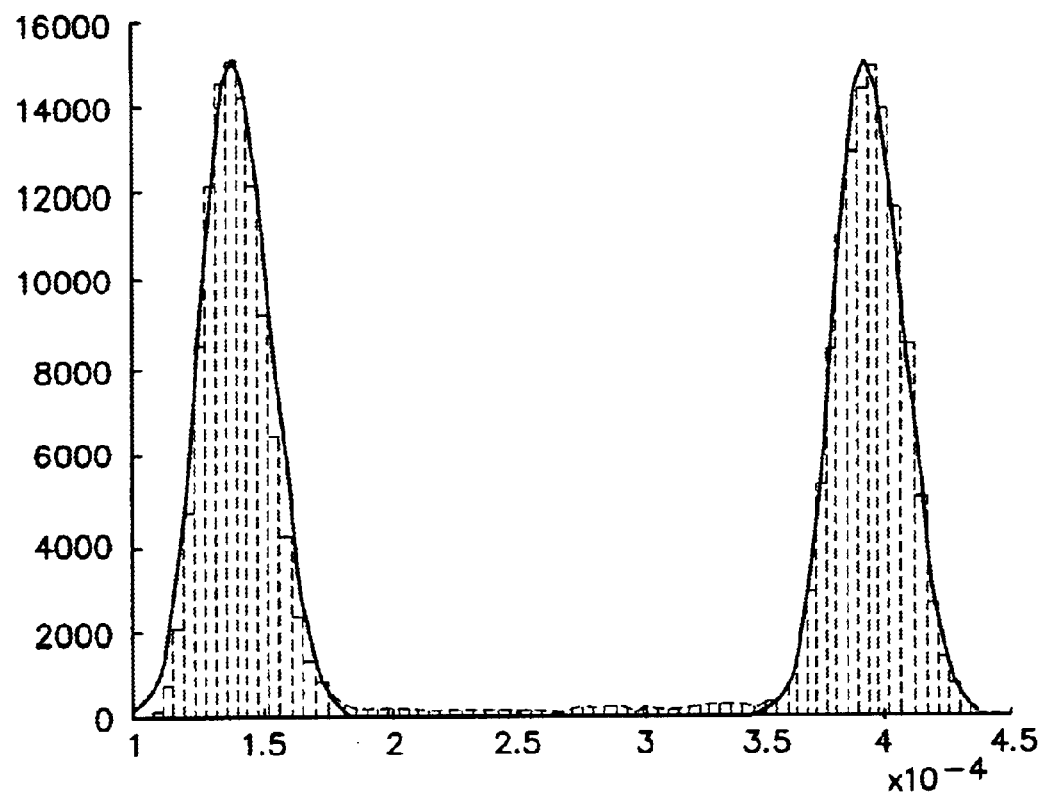
FIG. 4 represents a probability density function (PDF) of a single data channel, as applied by the present invention.

FIG. 4 represents a probability density function of a single data channel. The vertical axis represents probability density, whereas the horizontal axis represents optical power in Watt (W).

The solid line represents the estimated Gaussian probability density function.

Figure 5:
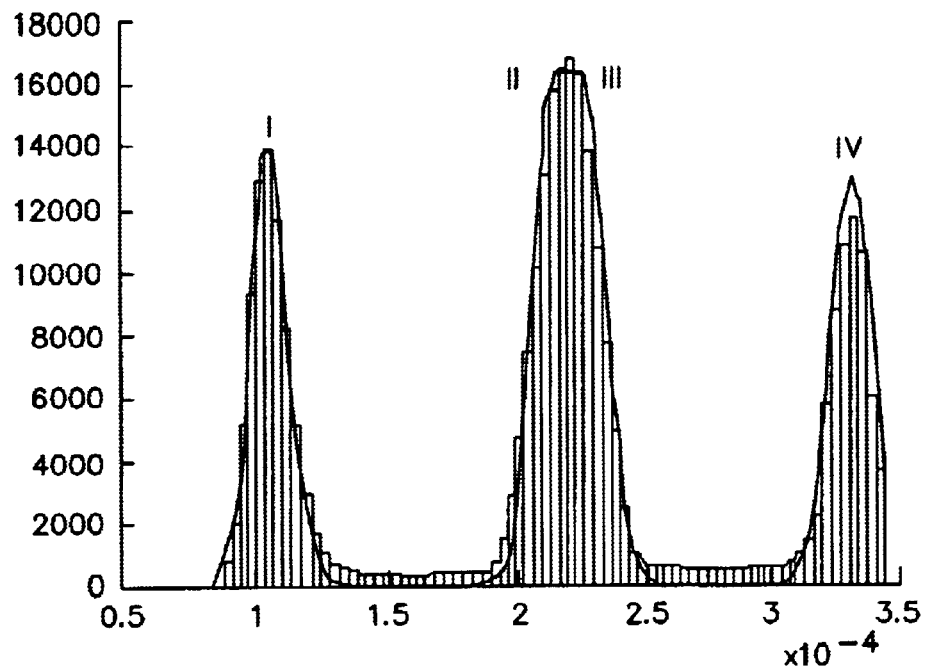
FIG. 5 represents a measured probability density function of two channels as applied by the present invention.

FIG. 5 represents a measured probability density function of two channels. The horizontal axis represents optical power in Watt (W), whereas the vertical axis represents the probability density.

The solid line represents its approximated Gaussian model.

According to the Gaussian model of a two channel PDF, the measured probability density function should contain four Gaussian peaks, however, in FIG. 5 only three peaks are visible.

Figure 6:
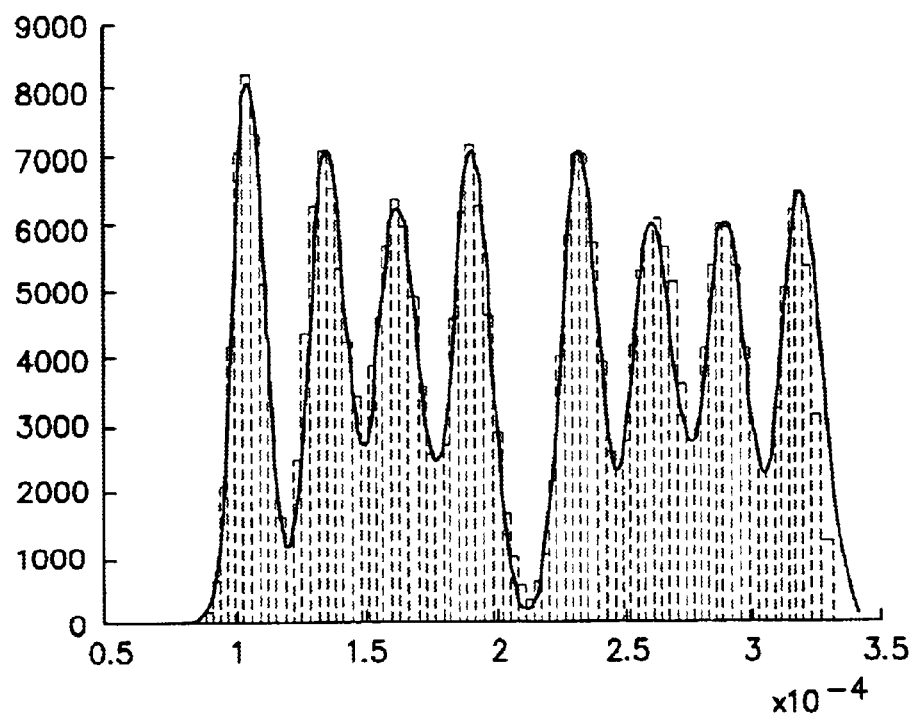
FIG. 6 represents a measured probability density function of three channels, as applied by the present invention.

FIG. 6 represents a measured probability density function of three channels. The axes and the solid line represent data similar to those in FIG. 5

Data channel statistics will now be explained in more detail.

Each channel is characterized by a plurality of signal levels representing data. In particular, each channel is characterized by a plurality of levels of "1" and "0".

Another important tool in the statistical analysis is the probability density function (PDF) already mentioned in the foregoing. It will be appreciated by those skilled in the art, that the PDF of an optical signal can be written as a sum of Gaussian functions. A Gaussian function has two variables; the variance and the mean.

The PDF of a single data channel can be written as a sum of two Gaussian functions, one describing the '0' level of the data channel and the other the '1' level of the data channel. Assuming the probability of a '0' and '1' bit is the ½, the PDF a data channel can be described by four Gaussian parameters; the variance and mean of the '0'level, and the variance and mean of the '1' level. The mean and variance of each approximate Gaussian peak in the single data channel PDF corresponds to the average optical power and noise of a bit level of the data modulated on the data channel, respectively. It will be appreciated by those skilled in the art that more than two signal levels can be applied.

The PDF of multiple data channels can be reconstructed from optimisation of the Gaussian parameters of individual data channels.

The values for the means and variances in the measured PDF containing multiple data channels are a linear combination of the values for the means and variances of the Gaussian channel parameters. The use of a priori information about the Gaussian channel parameters will provide the necessary number of equations out of the measured PDF's to solve the parameters for the on-line Gaussian channel parameters of a plurality of data channels.

Figure 7:
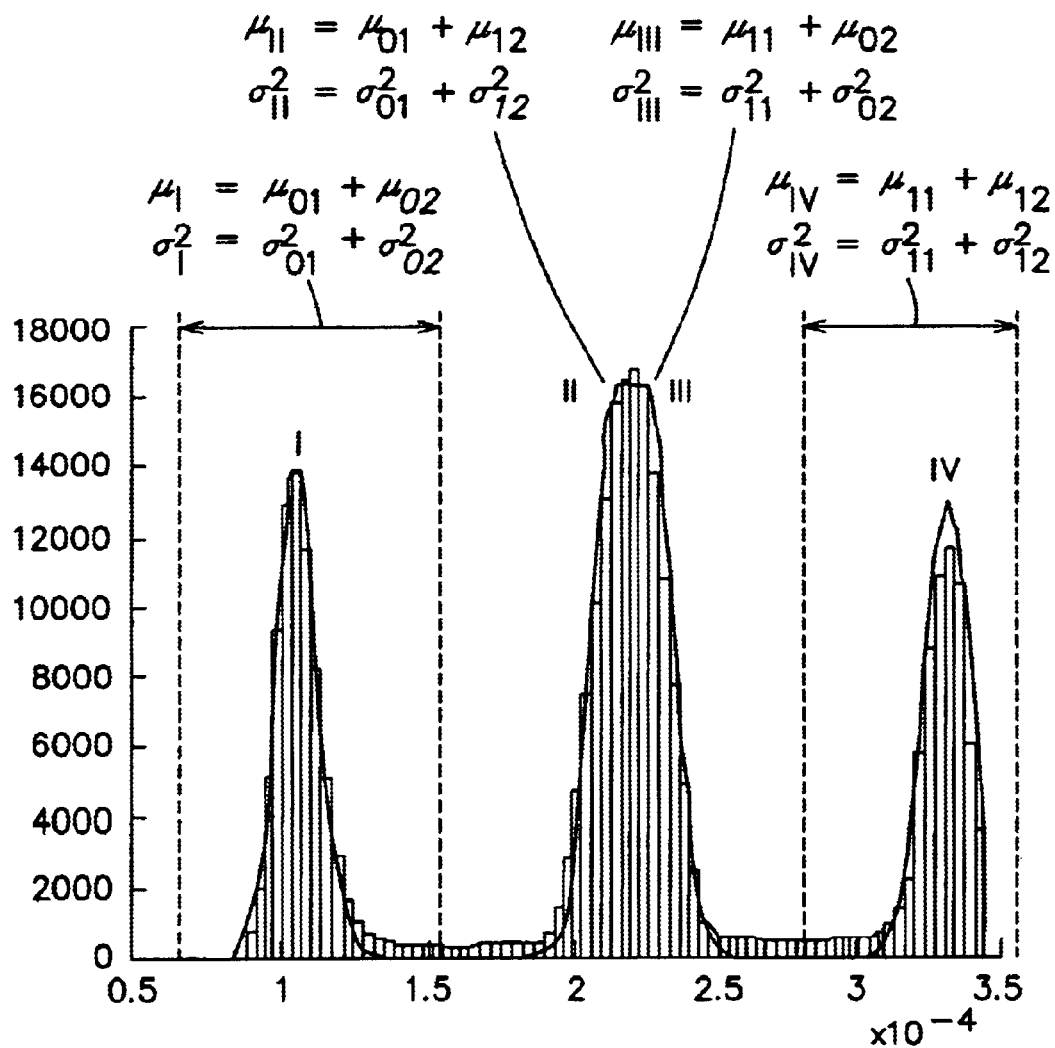
FIG. 7 represents a priori solution ranges of the means in the measured multiple channel.
Figure 8:
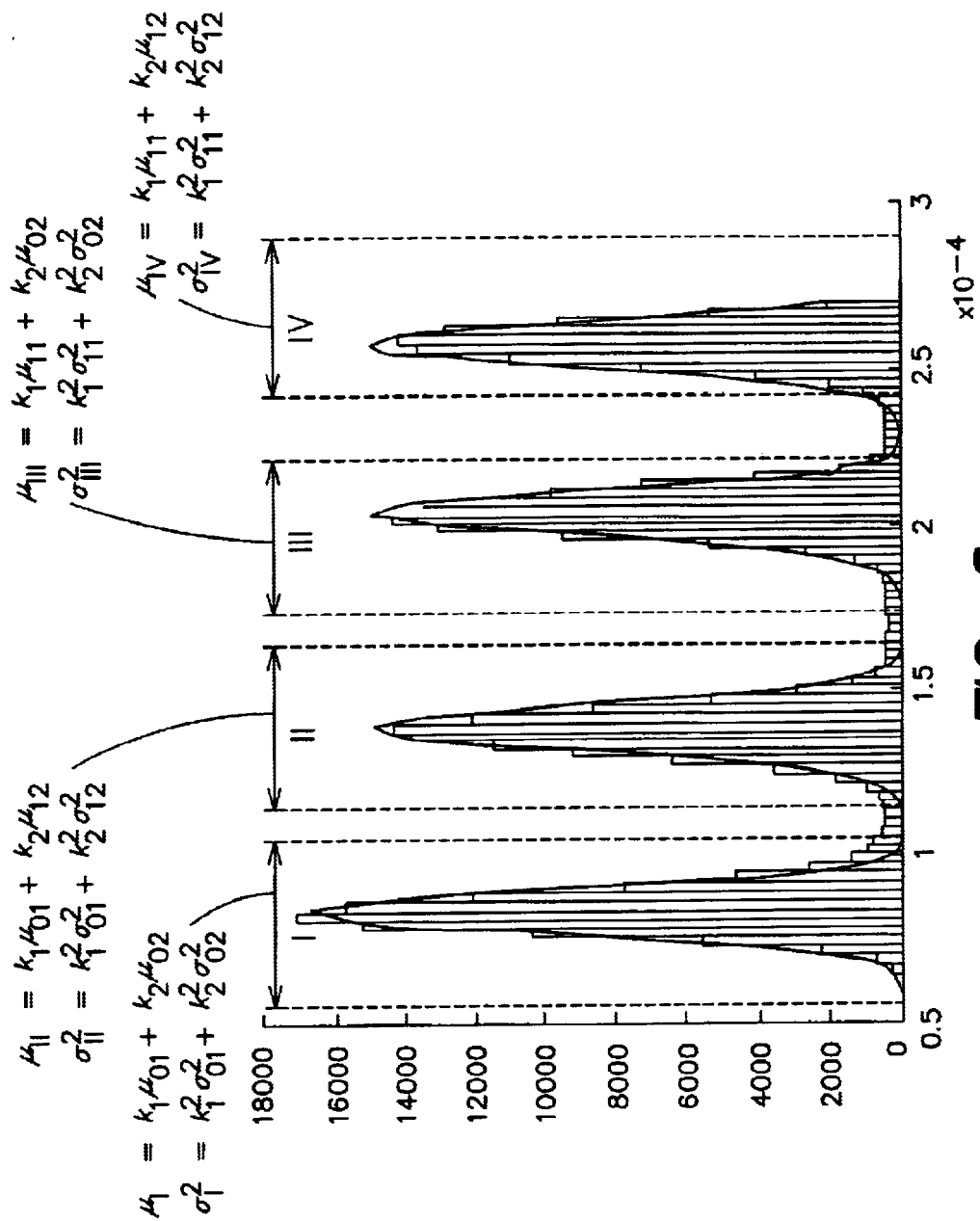
FIG. 8 represents a priori ranges of the means in the measured multiple channel of an opto-electronic converted optical signal with all data channels attenuated differently.

FIGS. 7 and 8 will be discussed afterwards in more detail by reference to the analysis of the multiple channel PDF.

Figure 9:
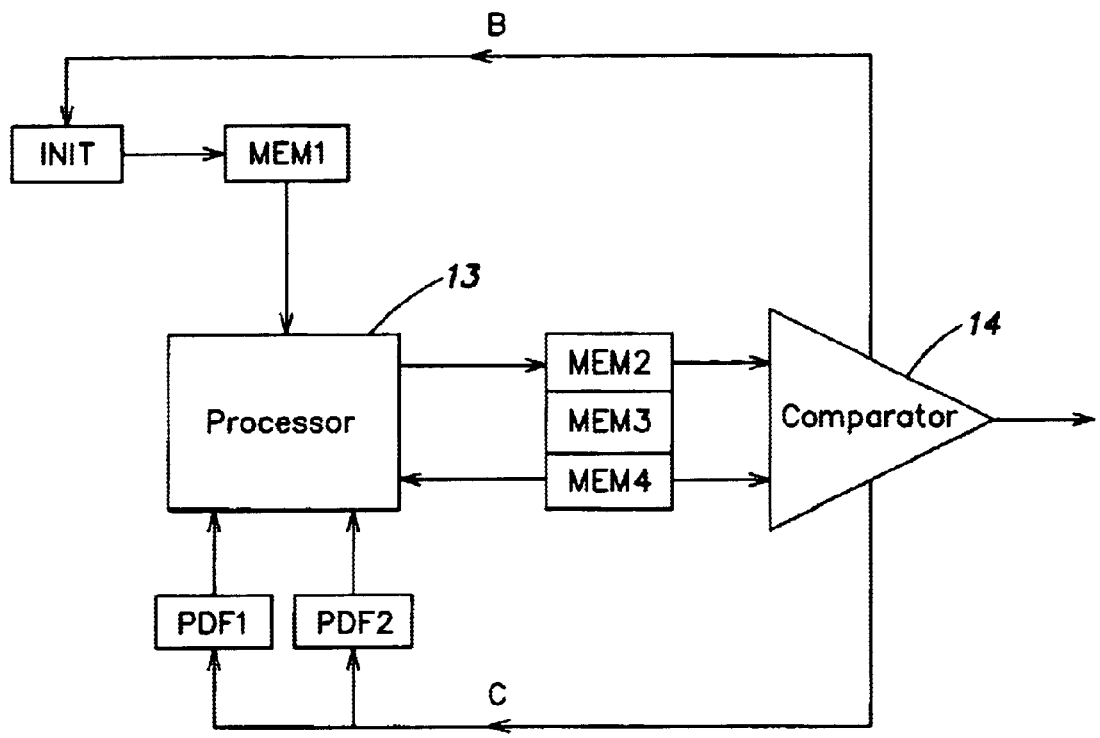
FIG. 9 represents schematically an estimation process for the parameter characterizing data channels, as applied by the present invention.

FIG. 9 represents by way of non-limiting example a PDF processing diagram which can be applied in an advantageous manner by the present invention. The Gaussian channel parameters of the measured PDF's are extracted, using any suitable optimisation algorithm. Algorithms for the optimisation of parameters are known as such to those skilled in the art and will therefore not be described in detail. Examples of such algorithms are genetic algorithms, neural networks, and the like.

To obtain the initial optimisation of each data channel, the optical WDM network is configured in such a way that only the desired data channel is transmitted over the network (INIT). This is carried out at any frequency suitable for the purpose, e.g. once a day. The PDF of this channel is measured, then the Gaussian channel parameter and the attenuation of the λ-dependent attenuator of this data channel are estimated. The estimated Gaussian channel parameters and attenuation of this channel are stored in a memory (MEM1). This process is repeated for all data channels. These Gaussian channel parameters and channel attenuations are used as a priori information for the optimisation algorithm During a predetermined time period, e.g. one day, the on-line PDF's containing multiple data channels are measured. The measured on-line PDF's (PDF1 and PDF2) are advantageously processed by the algorithm. The algorithm generates randomly Gaussian channel parameters of the data channels, and these Gaussian channel parameters are used to reconstruct the PDF containing all data channels. The algorithm uses the correlation between estimated PDF and measured PDF to select the best estimates of the Gaussian channel parameters, these best estimates will be used to make new/better estimates of the Gaussian channel parameters of each data channel and this process will be repeated several times until a fairly good estimate of the Gaussian channel parameters of each data channel is found (block 13).

This best estimate of this Gaussian channel parameter will be stored in a memory (MEM2). This Gaussian channel parameter is then compared in block 14 to a previously stored reference Gaussian channel parameter (MEM4). This comparison gives information about changes in the on-line Gaussian channel parameters. Changes in the Gaussian channel parameter may be reported in any way suitable for the purpose to the optical network management system for monitoring purposes (management purposes or network management purposes). In case of a large misfit the monitoring system is re-initialized via line B, whereas in case of a small misfit the Gaussian channel parameters are adjusted via line C. The measured Gaussian channel parameter will be stored (MEM3) and used as a priori information in the next measurement. If the value for the correlation of the best Gaussian channel parameter does not approach a predetermined value, it means that the PDF model of the algorithm was not able to realize a satisfying fit, and this can be interpreted as a major deviation in the Gaussian channel parameter and in that case an alarm signal can be provided.

It will be appreciated by those skilled in the art hat in this manner Gaussian channel parameters can be extracted for an optical signal containing multiple data channels.

For a better understanding of the invention an analysis of the multiple channel PDF will now be disclosed in more detail below and a general theoretical model for PDF's containing multiple data channels is derived.

Analysis of the Multiple Channel PDF

To extract the monitor information about the individual data channels in an optical signal from its measured PDF, it is necessary to find a theoretical model for a multiple channel PDF which relates monitor information of the individual data channels to the shape of the multiple channel PDF. The multiple channel PDF is related to the PDF of the individual data channels in the following way:

$$PDF_{1,\ldots,N}(x) = \int_{-\infty}^{\infty} PDF_{1,\ldots,N-1}(x-y) PDF_N(y) dy \qquad (1)$$

wherein $PDF_{1,\ldots,N}$ represents the PDF of the plurality of N channels, and wherein N is a positive integer and $PDF_N$ represents the PDF of channel N.

For example, in the case of a two data channel PDF, Eq. (1) reduces to $$PDF_{1,2}(x) = \int_{-\infty}^{\infty} PDF_1(x-y) PDF_2(y) dy \qquad (2)$$

In the following lines, a theoretical model for the PDF of an optical signal containing multiple data channels is presented. This model is based on the Gaussian approximation of a single data channel PDF.

Assuming that noise on the amplitude level of the data modulated on the data channels can be described by white noise, the PDF of a single data channel can be described by two Gaussian functions $\phi(x,\mu_0,\sigma_0^2)$ and $\phi(x,\mu_1,\sigma_1^2)$:

$$PDF_i(x) = \tfrac{1}{2}[\phi(x,\mu_{0i},\sigma_{0i}^2) + \phi(x,\mu_{1i},\sigma_{1i}^2)] \qquad (3)$$

wherein i=1, . . . N representing the channel number and where the means $\mu_0$ and $\mu_1$ correspond to the average optical power of the "0" and "1" bitlevel of the data modulated on the data channel and the variances $\sigma_{0i}$ and $\sigma_{1i}$ correspond to the noise on the "0" and "1" bitlevel, respectively, of the channel i. In FIG. 4, Eq. (3) is fitted to a measured PDF of a single data channel.

The theoretical model of two data channels 1 and 2 can a be described by $$PDF_{1,2}(x) = \qquad (4)$$

$$\frac{1}{4}\left[\begin{array}{l}\varphi(x,\mu_{01}+\mu_{02},\sigma_{01}^2+\sigma_{02}^2)+\varphi(x,\mu_{11}+\mu_{02},\sigma_{11}^2+\sigma_{02}^2)+\\ \varphi(x,\mu_{01}+\mu_{12},\sigma_{01}^2+\sigma_{12}^2)+\varphi(x,\mu_{11}+\mu_{12},\sigma_{11}^2+\sigma_{12}^2)\end{array}\right]$$

and the general theoretical model of the PDF for N data channels is given by $$PDF_{1,\ldots N}(x) = \frac{1}{2^N}\left[\begin{array}{l}\varphi(x,\mu_{01}+\ldots+\mu_{0N},\sigma_{01}^2+\ldots\sigma_{0N}^2)+\ldots+\\ \varphi(x,\mu_{11}+\ldots+\mu_{1N},\sigma_{11}^2+\ldots\sigma_{1N}^2)\end{array}\right] \qquad (5)$$

The following conclusions can be drawn for the theoretical model of a multiple channel PDF:
  A single data channel PDF can be approximated by two Gaussians functions.
  The peaks in the measured multiple data channel PDF can also be approximated by Gaussian peaks. Their variances and means are linear combinations of the variances and means of the Gaussian channel parameters of the individual data channels.

A multiple data channel PDF can be constructed out of the single channel PDFs of the individual data channels.

Realising that a single channel PDF can be described by a finite number of parameters, it follows that the multiple channel PDF can also be represented by a finite number of parameters. These parameters describe the signal quality of the individual data channels and are estimated using optimisation techniques, such as, as already disclosed in the foregoing, genetic algorithms, neural networks, Monte-Carlo methods, and the like.

The Role of the λ Dependent Attenuator

Therefore being able to reconstruct the multiple data channel PDF by using the single channel PDFs of the individual data channels, it should also be possible to extract the Gaussian channel parameters of the individual data channels from the multiple channel PDF. This estimation process is referred to in mathematical literature as the inverse problem.

In the following lines, the inverse problem to extract the monitor information for the individual data channels from a measured multiple channel is discussed by way of example only and illustrated with a two channel PDF example.

Firstly the theoretical model of the PDF is fitted to a measured two channel PDF. As is derived above, the peaks in the measured multiple channel PDF can also be approximated by Gaussian peaks with a mean and variance. In FIG. 5 a measured two channel PDF is presented. The means and variances belonging to the peaks in FIG. 5 are presented in Table 1:

TABLE 1

Values for the mean and variance
of the Gaussian peaks in FIG. 5

| Gaussian peak L | I | II | III | IV |
|---|---|---|---|---|
| $\mu_L$ ($\mu$W) | 106 | ? | ? | 332 |
| $\sigma_L^2$ (pW$^2$) | 48 | ? | ? | 60 |

According to Eq. (4), the values for the mean and variance of the peaks in the multiple channel PDF are a linear combination of the values for the mean of the "0" and "1" bitlevel and variances of the individual data channel means values to a measured mean of a Gaussian peak in the multiple channel PDF. To solve this problem, a priori information on the mean values of the individual data channel can be used to define the position and the solution range for the mean of a certain Gaussian peak in the multiple channel PDF (see FIG. 7) using its corresponding equation for the means of the individual data channel. In the case of FIG. 7 the method provides two equations for the means and two equations for the variances, with eight Gaussian channel parameters to solve.

$$\mu_I = \mu_{01} + \mu_{02} = 106 \ \mu W \qquad \sigma_I^2 = \sigma_{01}^2 + \sigma_{02}^2 = 48 \ pW^2 \qquad (6)$$
$$\mu_{IV} = \mu_{11} + \mu_{12} = 332 \ \mu W \quad \text{and} \quad \sigma_{IV}^2 = \sigma_{11}^2 + \sigma_{12}^2 = 60 \ pW^2$$

It can be observed from FIG. 7, that Eq. (6) cannot be solved uniquely since the amplitude levels of a first channel and a second channel can be interchanged. This problem can be overcome by generating extra independent equations, obtained from a measured PDF of the same optical signal with every data channel attenuated with a different attenuation factor (see FIG. 8). In FIG. 8 the second data channel was attenuated by a factor 2 with respect to the other channel. The means and variances belonging to the peaks in FIG. 8 are presented in Table 2:

TABLE 2

Values for the mean and variance
of the Gaussian peaks in FIG. 8

| Gaussian peak L | I | II | III | IV |
|---|---|---|---|---|
| $\mu_L$ ($\mu$W) | 75 | 140 | 205 | 255 |
| $\sigma_L^2$ (pW$^2$) | 34.4 | 44.2 | 44.2 | 44.2 |

The equations corresponding to the Gaussian peaks in FIG. 8 are, $$\mu_I = k_1 \mu_{01} + k_2 \mu_{02} = 75 \ \mu W \qquad (7)$$
$$\mu_{II} = k_1 \mu_{01} + k_2 \mu_{12} = 140 \ \mu W$$
$$\mu_{III} = k_1 \mu_{11} + k_2 \mu_{02} = 205 \ \mu W$$
$$\mu_{IV} = k_1 \mu_{11} + k_2 \mu_{12} = 255 \ \mu W$$

and $$\sigma_I^2 = k_1^2 \sigma_{01}^2 + k_2^2 \sigma_{02}^2 = 34.4 \ pW^2$$
$$\sigma_{II}^2 = k_1^2 \sigma_{01}^2 + k_2^2 \sigma_{12}^2 = 44.2 \ pW^2$$
$$\sigma_{III}^2 = k_1^2 \sigma_{11}^2 + k_2^2 \sigma_{02}^2 = 44.2 \ pW^2$$
$$\sigma_{IV}^2 = k_1^2 \sigma_{11}^2 + k_2^2 \sigma_{12}^2 = 44.2 \ pW^2$$

where $k_1$ and $k_2$ are the attenuation factors of data channel 1 and 2, respectively.

Analysing the set of equations in Eq. (7), it is found that only six of the eight equations are independent. Therefore, adding both sets of equations in Eq. (6) and (7) results into a set of equations, which exists out of ten independent equations to solve the eight Gaussian channel parameters. The least squared error solution for the extracted Gaussian channel parameters of the individual data channel in the illustrated example is presented in Table 3:

TABLE 3

Extracted Gaussian channel parameters of
the individual data channels in the example.

| Data channel i | $\sigma_{0i}^2$ (pW$^2$) | $\mu_{0i}$ ($\mu$W) | $\sigma_{1i}^2$ (pW$^2$) | $\mu_{1i}$ ($\mu$W) |
|---|---|---|---|---|
| 1 | 35 | 58 | 40 | 179 |
| 2 | 12 | 46 | 21 | 155 |

Extraction of the Number of Data Channels

According to Eq. (5), the model of a PDF containing N data channels is a sum of $2^N$ Gaussian functions multiplied by the factor $\frac{1}{2}^N$. Therefore the surface underneath the first peak in the model of the PDF should equal to $\frac{1}{2}^N$. Thus calculating the surface beneath the first Gaussian peak in a measured PDF of an optical signal should provide information about the number of data channels present in that optical signal.

It will be appreciated that various modifications of the present invention will be apparent to those skilled in the art from the foregoing description. Such modifications are intended to fall within the scope of the appended claims.

What is claimed is:

1. A method for monitoring an optical network being equipped with WDM equipment able to transmit a plurality of data channels at different wavelengths, said method comprising the steps of:

a) coupling out from the said optical network a portion of its optical power at a certain point in the optical network;

b) processing the portion of optical power resulting in a number of electrical signals;

c) analysing said number of electrical signals and deriving information on individual data channels; and d) producing data representing the result of step characterised in that step c) includes the successive substeps of c1) determining from said number of electrical signals at least one multiple channel statistical function of interest which characterises the said plurality of data channels; and c2) processing the said at least one determined function of interest in a predetermined mathematical model as to derive said information on individual data channels.

2. The method as claimed in claim 1, characterised in that the said predetermined mathematical model comprises a finite number of parameters.

3. The method as claimed in claim 1 or 2, wherein the said specific statistical function is a probability density function.

4. The method as claimed in claim 3, characterised in that the probability density function of a single data channel is represented by a sum of two Gaussian functions, one describing the '0' level of the data channel and the other the '1' level of said data channel.

5. The method as claimed in claim 3, wherein step a) comprises:

a1) coupling out from the said optical network the said part of the optical power at a certain point in the optical network and deriving therefrom an optical signal;

a2) processing this optical signal in such a manner that at least two sets of optical measurement data are obtained, said two sets representing a first optical processed signal and a second optical processed signal respectively; and a3) detecting opto-electronically the said two sets of optical measurement data; converting the data thus obtained into a digital form; subjecting the sets of digital measurement data to a statistical analysis and obtaining parameters which are characterizing each data channel.

6. The method as claimed in claim 5, wherein the probability density function of a single data channel is represented by a sum of two Gaussian functions, one describing the '0, level of the data channel and the other the '1' level of said data channel.

7. The method as claimed in claim 1 or 2, wherein step b) is carried out with the use of an optimisation algorithm.

8. The method as claimed in claim 7, wherein step a) comprises:

a1) coupling out from the said optical network the said part of the optical power at a certain point in the optical network and deriving therefrom an optical signal;

a2) processing this optical signal in such a manner that at least two sets of optical measurement data are obtained, said two sets representing a first optical processed signal and a second optical processed signal respectively; and a3) detecting opto-electronically the said two sets of optical measurement data; converting the data thus obtained into a digital form; subjecting the sets of digital measurement data to a statistical analysis and obtaining parameters which are characterizing each data channel.

9. The method as claimed in claim 1 or 2, wherein step a) comprises:

a1) coupling out from the said optical network the said part of the optical power at a certain point in the optical network and deriving therefrom an optical signal;

a2) processing this optical signal in such a manner that at least two sets of optical measurement data are obtained, said two sets representing a first optical processed signal and a second optical processed signal respectively; and a3) detecting opto-electronically the said two sets of optical measurement data; converting the data thus obtained into a digital form; subjecting the sets of digital measurement data to a statistical analysis and obtaining parameters which are characterizing each data channel.

10. The method as claimed in claim 9, characterised in that step b1) comprises the step of splitting the optical power obtained in step a).

11. The method as claimed in claim 10, wherein the said second optical signal obtained in step a2) is further processed by X-dependent attenuation.

12. The method as claimed in claim 9, wherein the said second optical signal obtained in step a2) is further processed by X-dependent attenuation.

13. The method as claimed in claim 9, wherein the data produced in step d) is used for management purposes or network management purposes.

14. The method as claimed in claim 1 or 2, wherein the data produced in step d) is used for management purposes or network management purposes.

15. An apparatus for monitoring an optical network being equipped with WDM equipment able to transmit a plurality of data channels at different wavelengths $\lambda_1, \ldots, \lambda_n$), said apparatus comprising:

means for coupling out from the said optical network a portion of its optical power;

means for processing said portion of optical power resulting in a number of electrical signals;

means for analysing said number of electrical signals and for deriving information on individual data channels; and means for producing data representing the said information on the individual data channels;

characterised in that the means of analyzing include:

means for determining from the number of electrical signals at least one multiple channel statistical function of interest which characterises the said plurality of data channels; and means for processing the said at least one determined function of interest in a predetermined mathematical model as to derive said information on is individual data channels.

16. The apparatus as claimed in claim 15, characterised in that said apparatus further comprises:

means for deriving an optical signal from said means for coupling out from the said optical network a portion of its optical power;

means for processing this optical signal in such a manner that at least two sets of optical measurement data are obtained, said two sets representing a first optical processed signal and a second optical processed signal, respectively;

means for detecting opto-electronically the said two sets of optical measurement data;

means for converting the data thus obtained into a digital form;

means for subjecting the sets of digital measurement data to a statistical analysis, and for obtaining parameters which are characterising each data channel.

17. The apparatus as claimed in claim 16, characterised in that said means for processing the said optical signal comprises a $\lambda$-dependent attenuator for further processing the said second optical signal.

18. The apparatus as claimed in claim 17, characterised in that the $\lambda$-dependent attenuator comprises two branches, the optical path-length of the first branch being different from the optical path-length of the second branch, said branches having a common signal input and a common signal output.

19. The apparatus as claimed in any one of claims 16–18, characterised in that the said means for processing the said optical signal comprises an optical switch, the output of which being connected to the input of the said means for detecting opto-electronically the said two sets of optical measurement data.

* * * * *